(12) United States Patent
Van Wey

(10) Patent No.: US 9,676,165 B2
(45) Date of Patent: Jun. 13, 2017

(54) STRUCTURAL BATTEN

(71) Applicant: LIBERTY DIVERSIFIED INTERNATIONAL, INC., New Hope, MN (US)

(72) Inventor: Scott Charles Van Wey, Crystal, MN (US)

(73) Assignee: Liberty Diversified International, Inc., New Hope, MN (US)

( * ) Notice: Subject to any disclaimer, the term of this patent is extended or adjusted under 35 U.S.C. 154(b) by 177 days.

(21) Appl. No.: 14/553,202

(22) Filed: Nov. 25, 2014

(65) Prior Publication Data

US 2015/0147534 A1 May 28, 2015

Related U.S. Application Data

(60) Provisional application No. 61/909,641, filed on Nov. 27, 2013.

(51) Int. Cl.
| | | |
|---|---|---|
| *B32B 3/28* | (2006.01) | |
| *B32B 15/04* | (2006.01) | |
| *B32B 7/12* | (2006.01) | |
| *B32B 21/04* | (2006.01) | |
| *B32B 7/08* | (2006.01) | |
| *B32B 7/04* | (2006.01) | |
| *B32B 21/08* | (2006.01) | |
| *B32B 3/02* | (2006.01) | |
| *B32B 3/04* | (2006.01) | |
| *B32B 3/20* | (2006.01) | |
| *E04D 12/00* | (2006.01) | |
| *E04B 1/70* | (2006.01) | |

(52) U.S. Cl.
CPC .................. *B32B 3/28* (2013.01); *B32B 3/02* (2013.01); *B32B 3/04* (2013.01); *B32B 3/20* (2013.01); *B32B 7/045* (2013.01); *B32B 7/08* (2013.01); *B32B 7/12* (2013.01); *B32B 15/04* (2013.01); *B32B 21/042* (2013.01); *B32B 21/08* (2013.01); *E04D 12/004* (2013.01); *B32B 2419/06* (2013.01); *E04B 1/7069* (2013.01); *Y10T 428/24686* (2015.01); *Y10T 428/24694* (2015.01); *Y10T 428/24727* (2015.01)

(58) Field of Classification Search
None
See application file for complete search history.

(56) References Cited

U.S. PATENT DOCUMENTS

| | | | | |
|---|---|---|---|---|
| 3,949,657 A | * | 4/1976 | Sells .......................... | F24F 7/02 454/365 |
| 4,136,630 A | * | 1/1979 | Fraser ..................... | B29C 53/28 114/102.27 |
| 4,464,872 A | * | 8/1984 | Eaton ........................ | E04C 2/10 52/276 |
| 4,803,813 A | * | 2/1989 | Fiterman ............... | E04D 13/174 156/227 |

(Continued)

*Primary Examiner* — David Sample
*Assistant Examiner* — Donald M Flores, Jr.
(74) *Attorney, Agent, or Firm* — Barnes & Thornburg LLP

(57) ABSTRACT

A structural batten provides a longitudinally extending first layer having a plurality of passages extending between opposing sides of the first layer and transverse to the longitudinal extent of the first layer. A longitudinally extending solid body layer is attached to the first layer along the first layer's longitudinal extent.

19 Claims, 11 Drawing Sheets

(56) References Cited

U.S. PATENT DOCUMENTS

| | | | | |
|---|---|---|---|---|
| 5,054,254 A | * | 10/1991 | Sells | E04D 13/174 |
| | | | | 454/365 |
| 5,094,041 A | * | 3/1992 | Kasner | F24F 7/02 |
| | | | | 454/365 |
| 5,304,095 A | * | 4/1994 | Morris | F24F 7/02 |
| | | | | 454/365 |
| 5,331,783 A | * | 7/1994 | Kasner | F24F 7/02 |
| | | | | 454/364 |
| 5,651,734 A | * | 7/1997 | Morris | E04D 1/36 |
| | | | | 454/365 |
| 5,947,817 A | * | 9/1999 | Morris | E04D 1/36 |
| | | | | 454/365 |
| 6,599,184 B2 | * | 7/2003 | Morris | E04D 13/174 |
| | | | | 454/365 |
| 6,938,383 B2 | * | 9/2005 | Morris | E04B 1/26 |
| | | | | 52/198 |
| 7,506,598 B2 | * | 3/2009 | Kimble | B63B 3/48 |
| | | | | 114/85 |
| 2005/0138879 A1 | * | 6/2005 | Snel | E04C 2/3405 |
| | | | | 52/506.01 |
| 2007/0117505 A1 | * | 5/2007 | Wey | E04D 13/176 |
| | | | | 454/366 |

\* cited by examiner

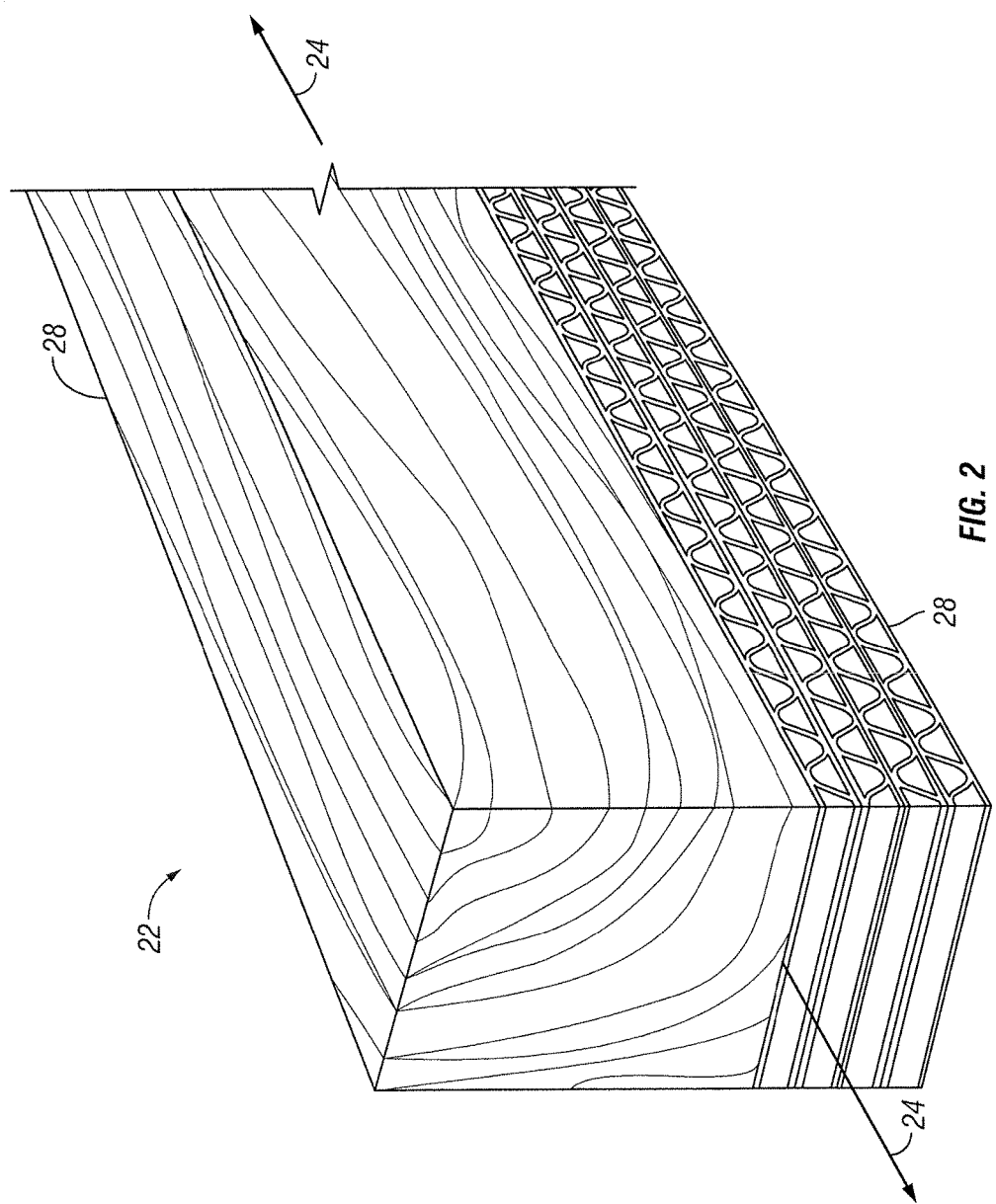

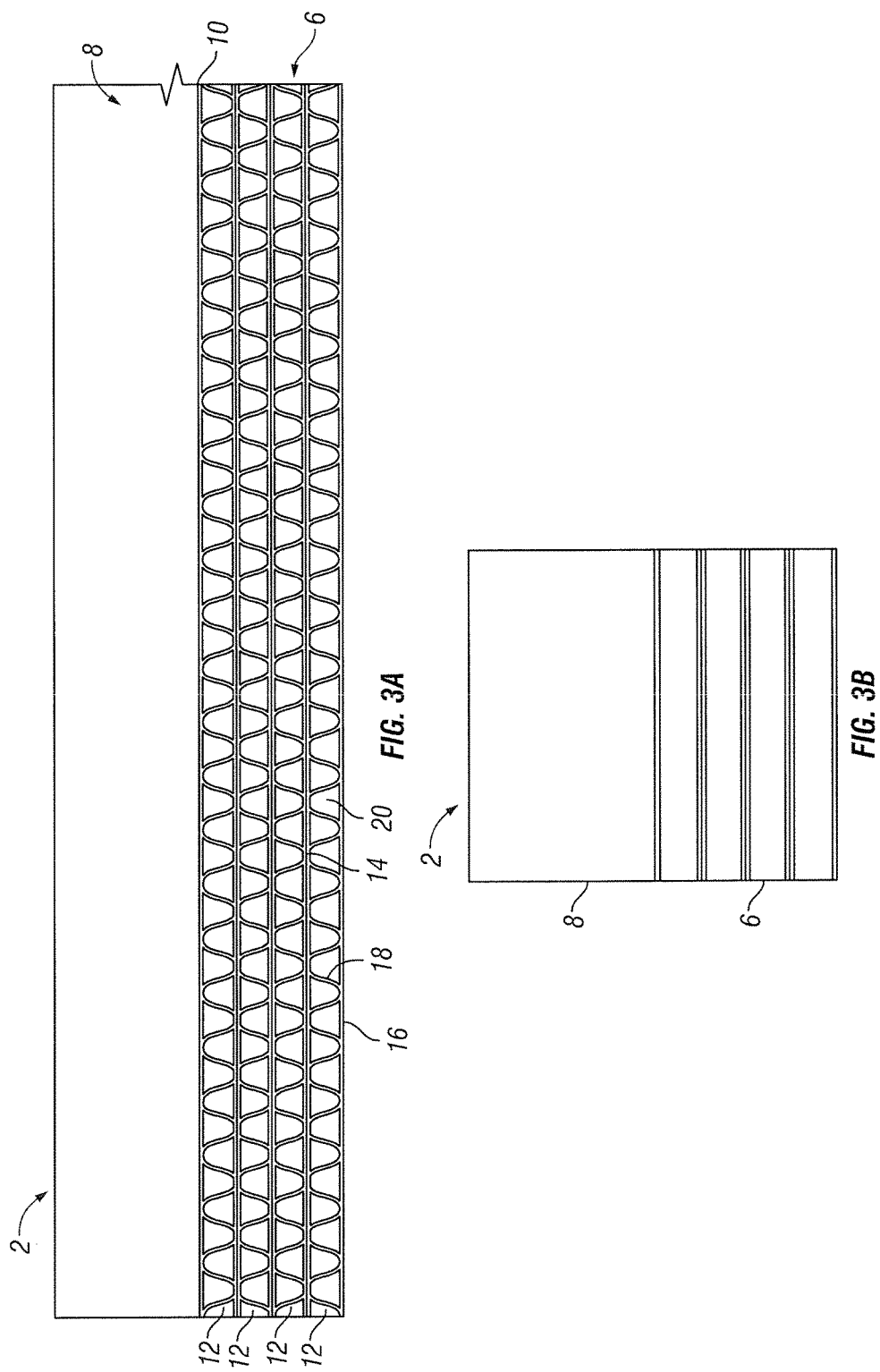

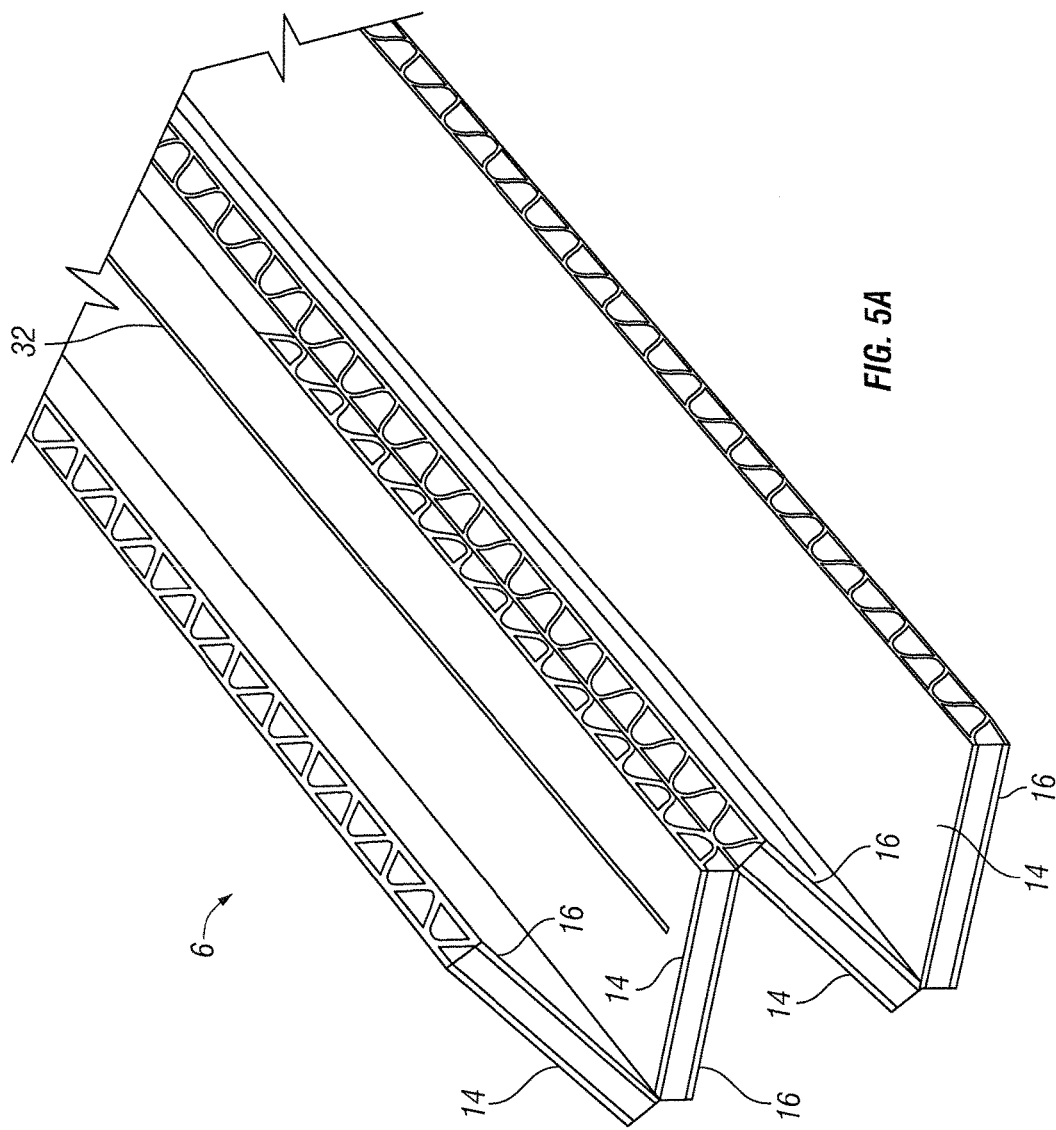

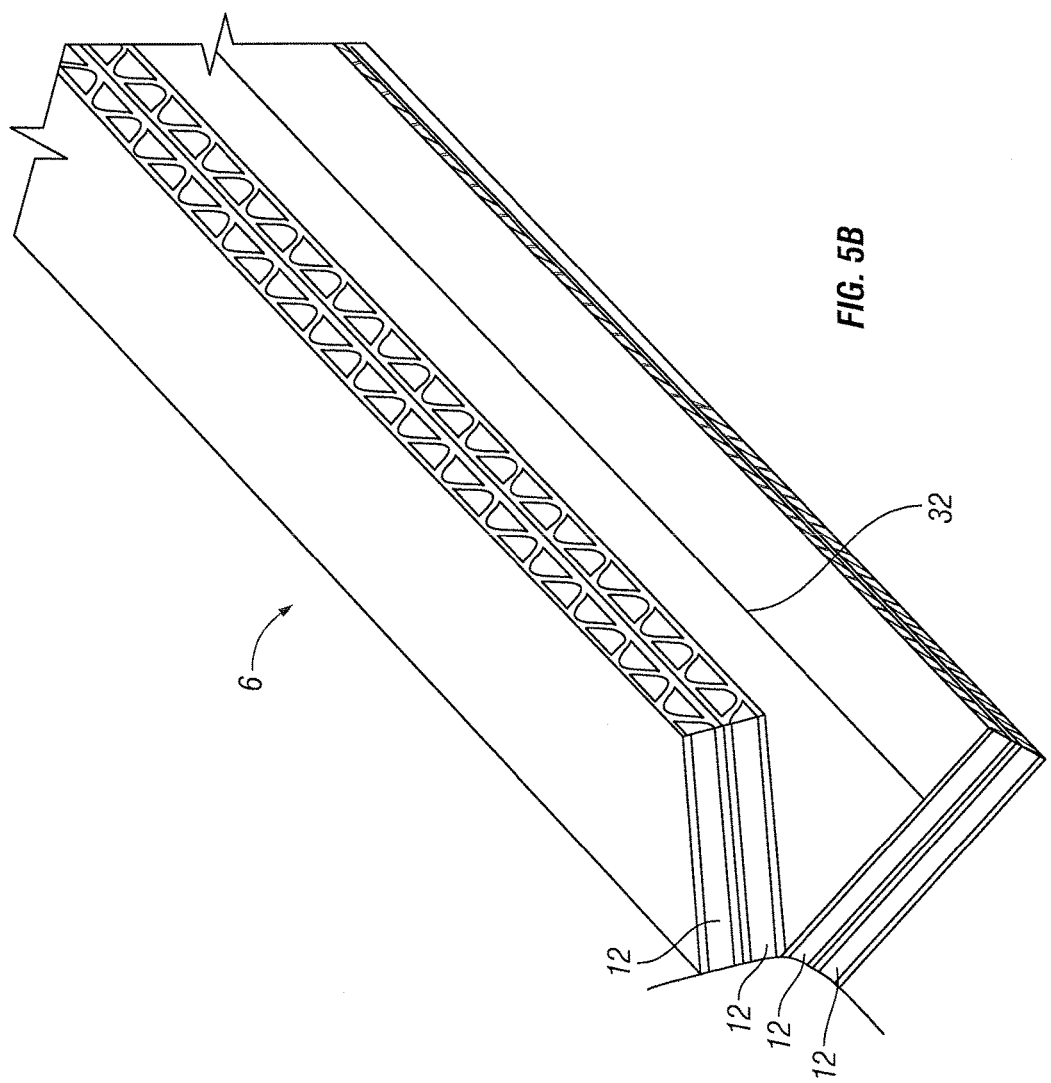

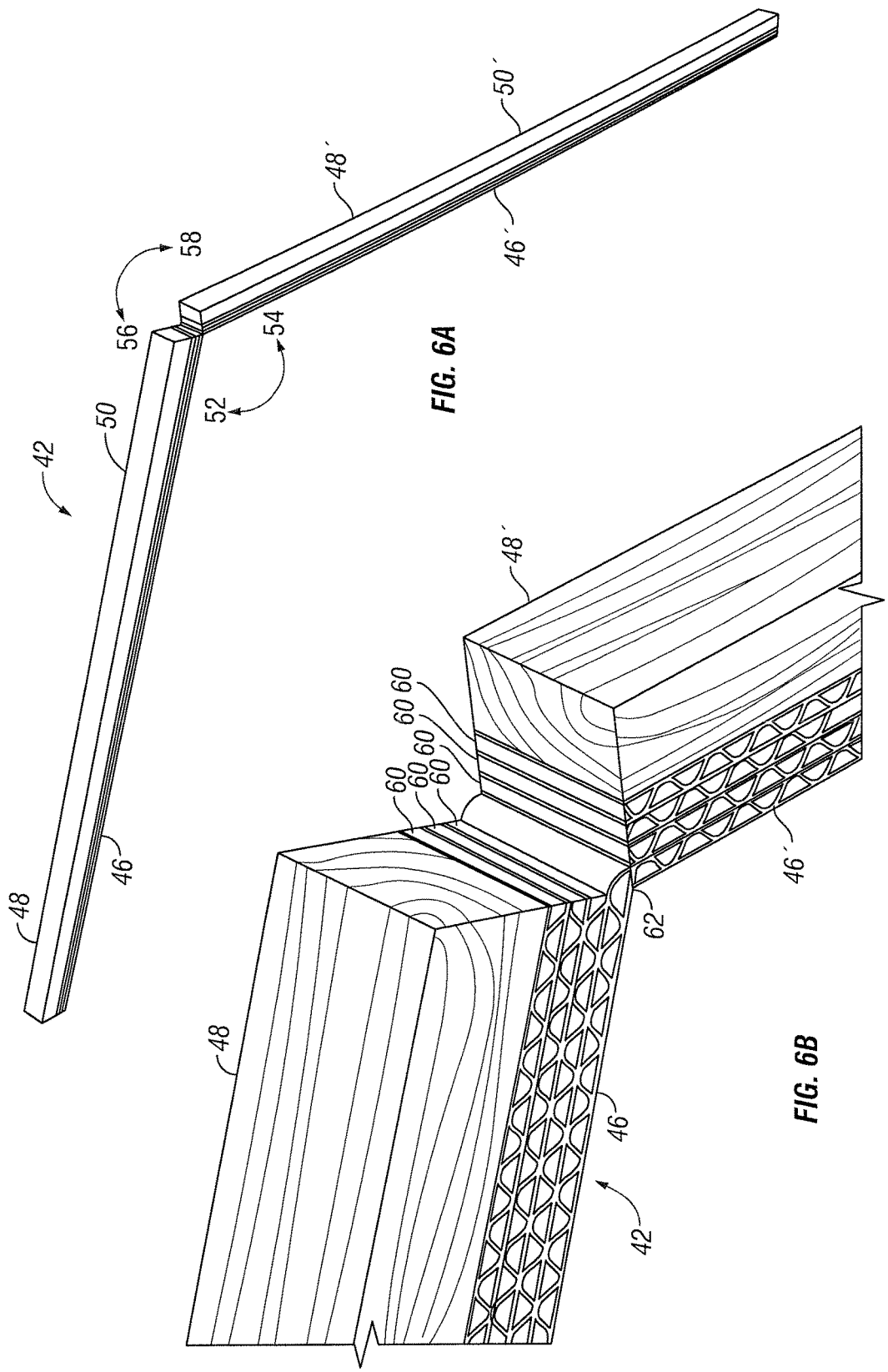

STRUCTURAL BATTEN

RELATED APPLICATIONS

The present application is related to and claims priority to U.S. Provisional Patent Application Ser. No. 61/909,641, filed on Nov. 27, 2013, entitled "Structural Batten." The subject matter disclosed in that provisional application is hereby expressly incorporated into the present application.

TECHNICAL FIELD AND SUMMARY

The present disclosure is related to a batten, such as a roof batten, that combines a solid batten component with an open composite batten material component.

When installing traditional (clay or concrete) tile shingles, composite tile shingles, or metal or steel roofing materials, a batten system is typically first installed on the roof sheeting. It is most common to first install wood battens vertically in consistently spaced intervals based on roof truss location. Wood battens are then installed horizontally at consistently spaced intervals on top of the vertical battens. This is often called a lathe and batten system. The shingles, or other roofing material, are then installed and secured onto the horizontal battens. This setup allows airflow water drainage between the roof deck and the roofing material.

Illustratively, this new batten will be a high-performing product allowing installers to do away with conventional vertical battens. This may save the installer time (and money) during the installation process. An illustrative embodiment of the present disclosure provides a batten having a structural anchoring surface configured to receive roofing material. Roofing material fasteners secure most effectively to a solid material more so than the open batten material. In contrast, open batten material includes passages that allow water to drain through. The present disclosure provides both the characteristics of a solid batten material to receive other building materials, such as shingles, and open batten material including passages to allow water to drain through the passages.

The batten of the present disclosure is a structural batten made by combining together a solid material batten with an open composite batten material. Illustratively, when installed, the solid material is exposed while open composite material is located adjacent the roof deck. The structural batten may be cut to any length, and may be scored and folded in half for easier packaging and transportation. This disclosure may also be used as a furring strip installed horizontally and vertically for siding applications.

Another illustrative embodiment of the structural batten provides a longitudinally extending first layer having a plurality of passages extending between opposing sides of the first layer and transverse to the longitudinal extent of the first layer; wherein the passages have openings on each of the opposing sides of the first layer and are configured to allow fluid communication from one side of the first layer to the other side and transverse to the first layer's longitudinal extent; and a longitudinally extending solid body layer attached to the first layer along the first layer's longitudinal extent.

In the above and other illustrative embodiments, the structural batten may further comprise: the solid body layer being configured to receive fasteners from construction materials; the solid body layer being made from a different material than the first layer; the solid body layer being made of wood; the solid body layer being made of wood and the first layer being made of a plastic; the plurality of passages in the first layer are formed in a manner selected from the group consisting of a convoluted material, corrugated material, bore through the first layer, molded in the first layer, extruded in the first layer, and assembled in the first layer; the solid body layer being attached to the first layer along the first layer's longitudinal extent in a manner selected from the group consisting of an adhesive, fasteners, welding, bonded, and molded; the first layer including a plurality of stacked layers of a plurality of passages extending between opposing sides of the stacked layers and transverse to the longitudinal extent of the stacked layers; the first layer including first and second spaced apart sub-layers with a convoluted sub-layer located therebetween and attached to the first and second spaced apart sub-layers; the convoluted sub-layer forms the plurality of passages extending between opposing sides of the first layer and transverse to the longitudinal extent of the first layer; the first layer includes a plurality of stacked layers of the first and second spaced apart sub-layers with the convoluted sub-layer located therebetween and attached to the first and second spaced apart sub-layers; the convoluted sub-layer forms the plurality of passages extending between opposing sides of each of the stacked layers and transverse to the longitudinal extent of each of the stacked layers; the first layer being made of a plastic; the solid body layer being made of a material selected from the group consisting of wood, plastic, and metal; the solid body layer being made of a laminated material; the first layer being made from a sheet of material scored on each side and folded to form the plurality of passages extending between opposing sides of the first layer and transverse to the longitudinal extent of the first layer; the sheet of material includes first and second spaced apart sub-layers with a convoluted sub-layer located therebetween; the solid body layer has a solid thickness in all dimensions; the solid body layer being separable along a plane transverse to the longitudinal extent of the solid body layer; the first layer being partially separable along a plane transverse to the longitudinal extent of the first layer such that a portion of the first layer being bendable to selectively fold or unfold the structural batten; the structural batten is attachable to a second structural batten wherein a hinge is attached to both the structural batten and the second structural batten so they selectively fold with respect to one another.

Another illustrative embodiment of the structural batten provides a longitudinally extending wood strip member; a longitudinally extending plastic strip member that includes a plurality of passages extending between opposing sides of the plastic strip member and transverse to the longitudinal extent of the plastic strip member; wherein the passages have openings on each of the opposing sides of the plastic strip member and are configured to allow fluid communication from one side of the plastic strip member to the other side and transverse to its longitudinal extent; and wherein the wood strip member is stacked on top of and attached to the plastic strip member.

In the above and other illustrative embodiments, the structural batten may further comprise the plastic strip member including a plurality of stacked plastic strip members.

Additional features and advantages of the structural batten will become apparent to those skilled in the art upon consideration of the following detailed description of the illustrated embodiment exemplifying the best mode of carrying out the structural batten as presently perceived.

BRIEF DESCRIPTION OF DRAWINGS

The present disclosure will be described hereafter with reference to the attached drawings which are given as non-limiting examples only in which:

FIG. 2 is another illustrative embodiment of a structural batten;

FIGS. 3A and B are side and end views of the structural batten;

FIGS. 5A through D are various perspective views showing an illustrative assembly of an embodiment of the structural batten;

FIGS. 6A and B are perspective and perspective detailed views of an embodiment of the structural batten that is foldable;

Corresponding reference characters indicate corresponding parts throughout the several views. The exemplification set out herein illustrates embodiments of the structural batten, and such exemplification is not to be construed as limiting the scope of the structural batten in any manner.

DETAILED DESCRIPTION OF THE DRAWINGS

Figure 1:
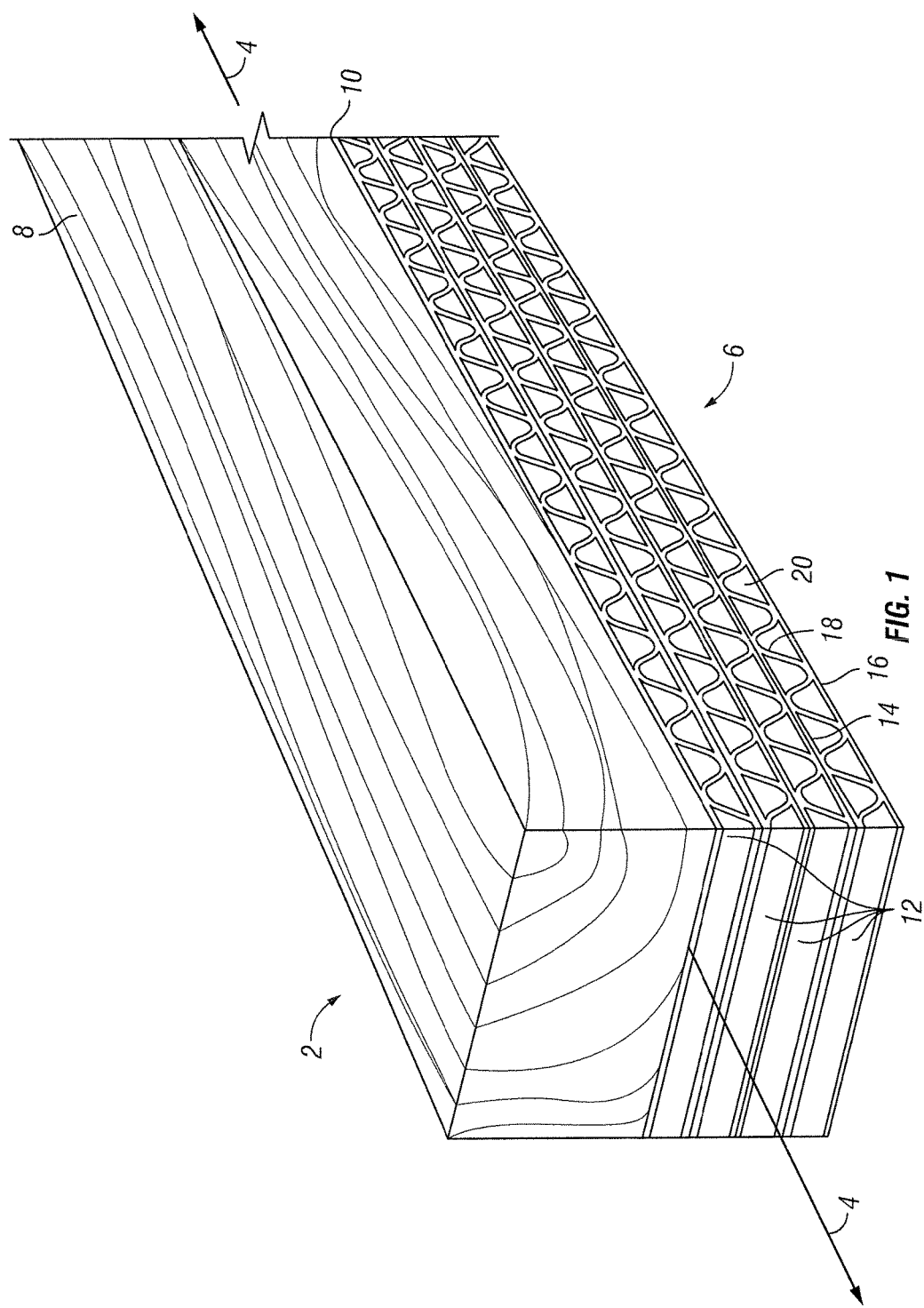
FIG. 1 is a perspective view of a structural batten according to the present disclosure.

A perspective view of a portion of a structural batten 2 is shown in FIG. 1. Structural batten 2 is narrow and longitudinally extending along axis 4. As shown herein, structural batten 2 comprises at least two distinct components; an open composite portion 6 and a solid body portion 8. In this illustrative embodiment, portions 6 and 8 are attached together at seam 10. It is appreciated that the attachment may be fasteners, adhesives, ultrasonic welding, or the like. In still another embodiment, the structural batten 2 may be all made of the same material, but still have segregated longitudinally open and solid portions. Embodiments contemplated within the scope of this disclosure include a batten having openings transverse to the longitudinal access of the batten.

As shown herein, the open composite portion includes convoluted layers 12 laminated together. In one embodiment, each layer 12 includes a top panel 14 and bottom panel 16 with a convoluted panel 18 located therebetween and spacing the top and bottom panels 14 and 16 apart. This is how a plurality of passages 20 are formed in open composite portion 6. It is appreciated that water is intended to flow from one side of the batten to the other transverse to its longitudinal axis, the configuration of the passages may be of any variety of shape, including round, square, convoluted (as shown), or other shapes, as long as the passages provide a fluid path from one side of structural batten 2 to the other. In addition, the material for the open composite portion may be plastic or other such material that is capable of draining moisture. Further, open composite portion 6 is shown having four convoluted layers 12. It is appreciated that the scope of this disclosure contemplates more or less of such layers be employed as the open composite portion, including only one. Solid body portion 8 is shown in FIG. 1 as a longitudinally extending illustrative wood block. As an illustrative embodiment, this block may be ¾ inch high by 1-½ inches wide.

In an alternative embodiment, such as that shown in FIG. 2, structural batten 22 includes an axis 24, an open composite portion 26, and solid body portion 28. In this embodiment, the solid body portion 28 may be 1-½ inches thick. The scope of this disclosure contemplates that the solid body portion may be a variety of thicknesses. It is appreciated that the solid body portion may be made of other solid materials, such as a plastic, metal, fibrous material, laminated materials, etc. The solid body portion 28 provides a structural member that may receive other building materials, such as roof tiles (see also FIG. 8) and siding (see also FIG. 9), for example. It is still further appreciated that the length of structural battens 2 or 22 may be in 48 inch lengths, 96 inch lengths, or other length increments. Additionally, the battens may be hinged for transport in shorter lengths and then folded open into longer lengths, such as that shown in FIGS. 6A and B.

Side and end views of structural batten 2 are shown in FIGS. 3A and B, respectively. This view demonstrates how structural batten 2 is bifurcated into open composite portion 6 and solid body portion 8. Because the purpose of the plurality of passages 20 in open composite portion 6 is to allow moisture to pass through, it is to be attached to a structural surface, such as a roof or wall. Then the solid body portion as shown in these views make it clear that it is available to attach to other construction materials, such as roof tiles, shingles, siding, etc. This solid body portion is more conducive to receiving nails, screws, and other like fasteners commonly used in construction.

Figure 4A:
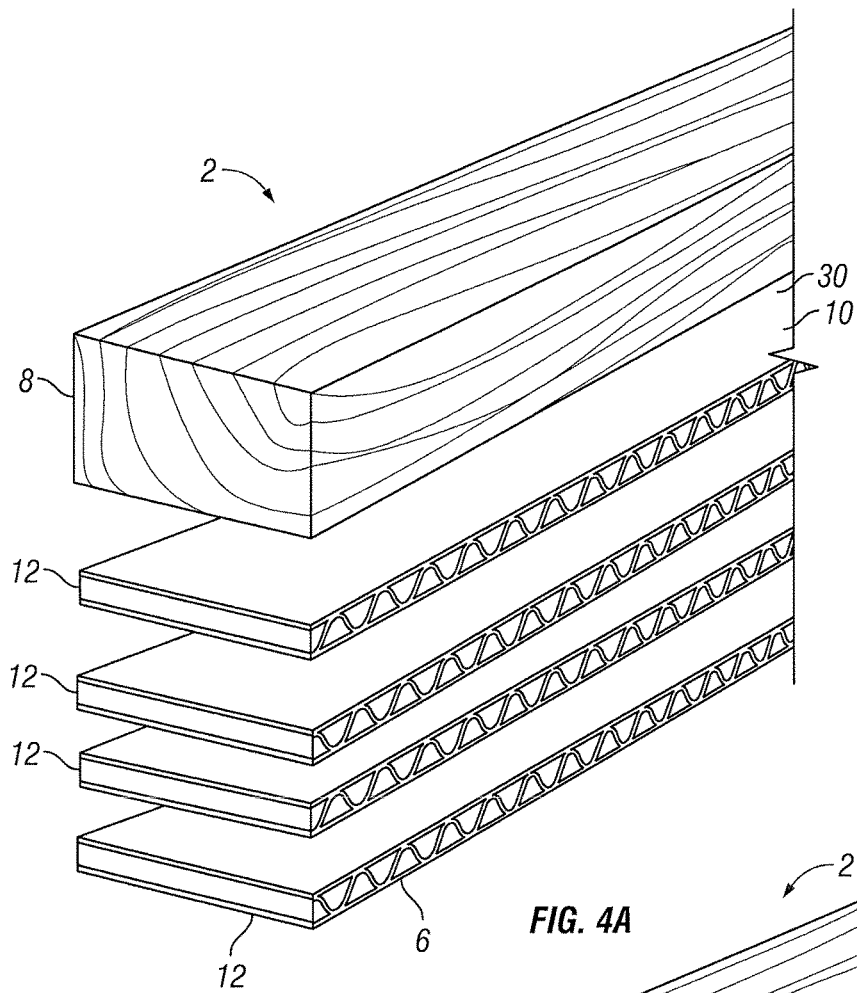
FIGS. 4A and B are exploded and corresponding assembled views of the structural batten.
Figure 4B:
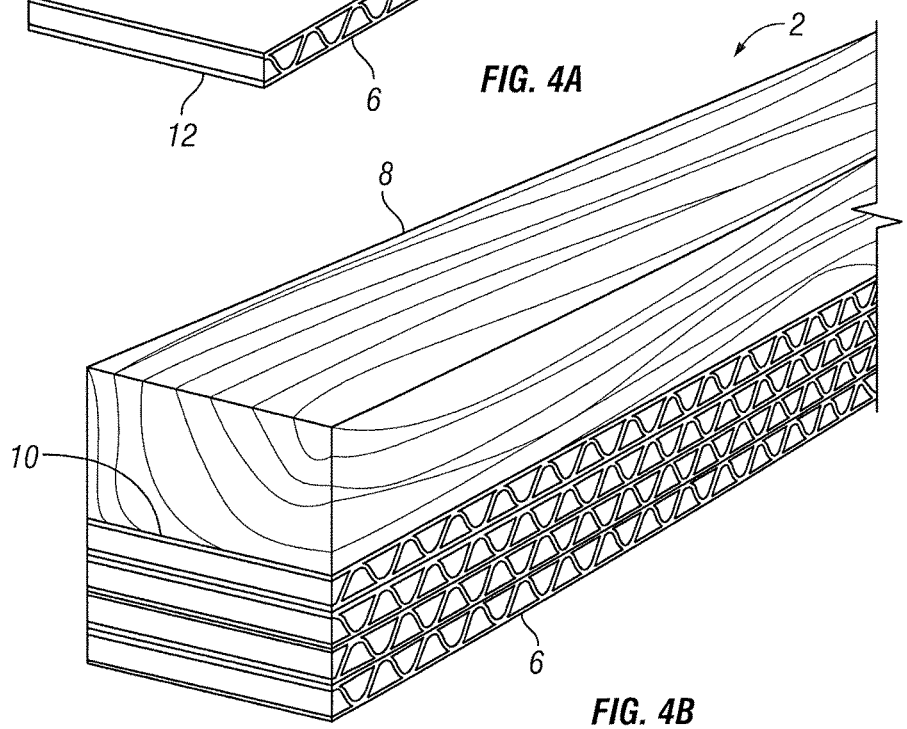

It is appreciated from these views how structural batten 2 is assembled. FIG. 4A shows structural batten 2 in an exploded view form, including each of the convoluted layers 12 and solid body portion 8. Each of the convoluted layers 12 may be glued, stapled, or ultrasonically welded rivets, nails, screws, heat welds, clips, bands, sewing, chemical bonds, stitched, or straps together, for example. Again, the number of convoluted layers 12 may be changed from one to several, based on the needs of the application. Solid body portion 8 may then be attached on to a surface 30 of portion 6 using adhesives, fasteners, or the like, to secure the two composite portions together at seam 10 forming structural batten 2, as shown in FIG. 4B.

Figure 5C:
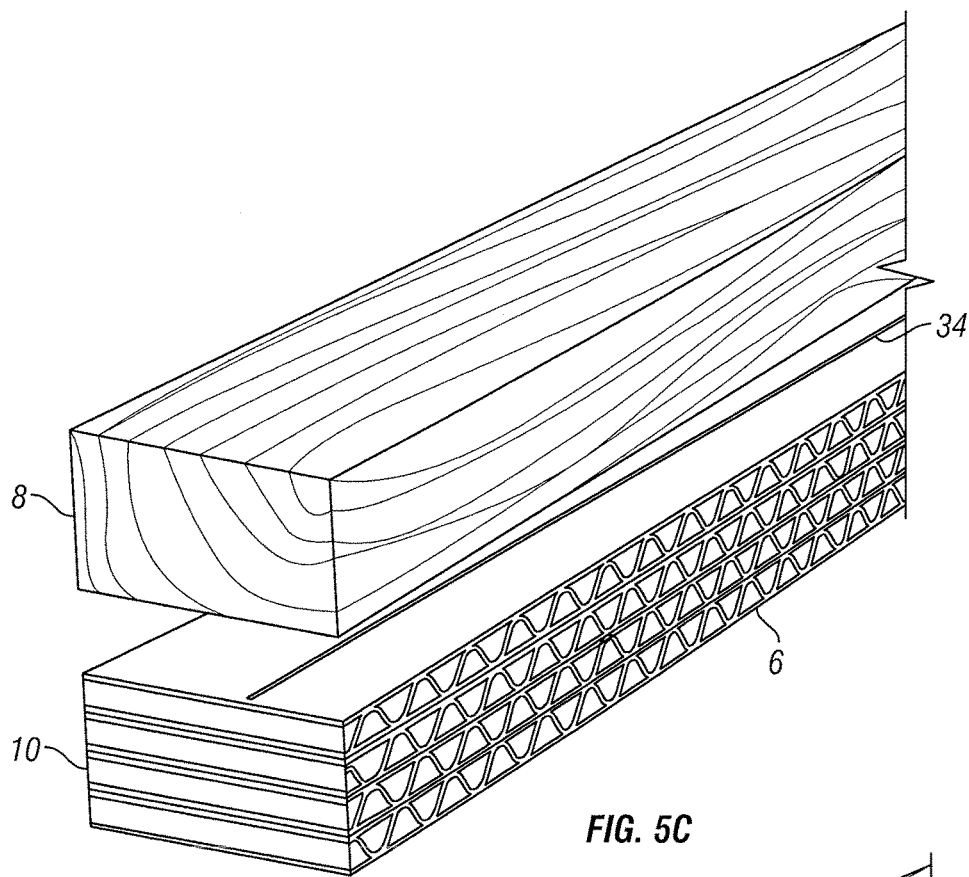
Figure 5D:
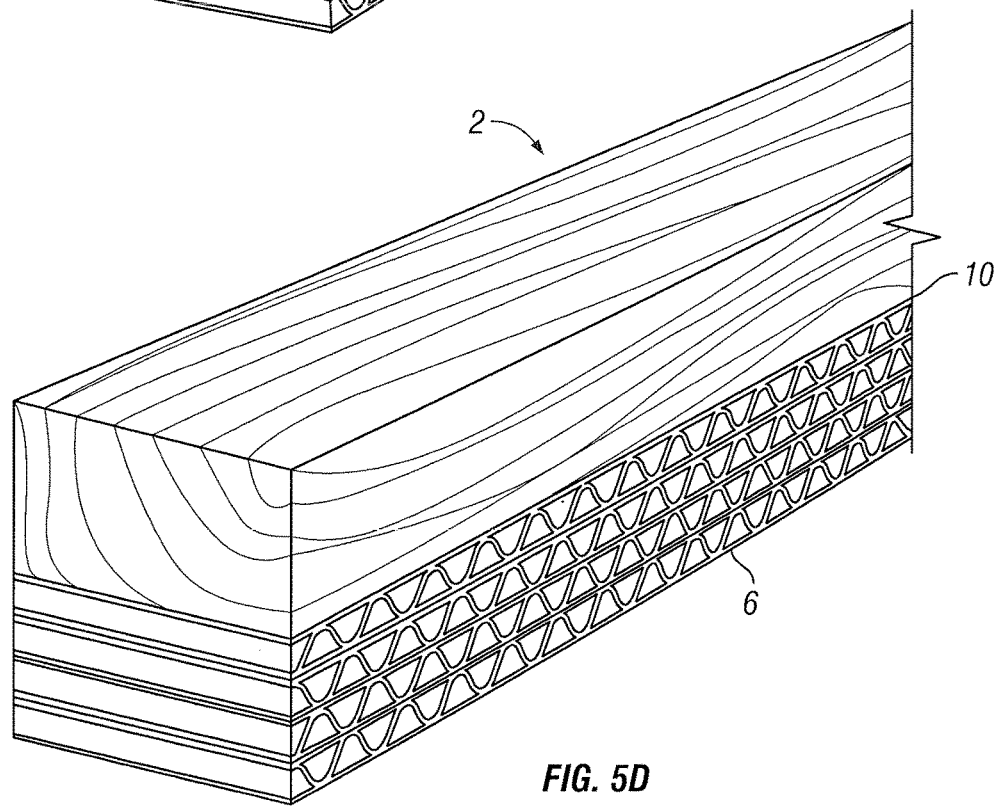

The perspective progression views in FIGS. 5A through D demonstrate another method of making structural batten 2. In this embodiment, open composite portion 6 is made from a single sheet of convoluted material that is scored on each panel 14 and 16 illustratively as shown so it can be folded in an accordion-type fashion to form the composite portion. As shown in FIG. 5B, an adhesive 32 may be applied between each of the layers 12 to secure them together. It is appreciated that, as an alternative to an adhesive, fastener-like staples may be used. Once all the layers 12 have been attached, open composite portion 6 may be attached to solid body portion 8 using an adhesive 34 or other fastening mechanisms, as shown in FIG. 5C. The resulting structural batten 2 is then formed as shown in FIG. 5D.

To assist in transporting these longitudinally extending structural battens 2, open composite 6 may be employed to form a hinge so that structural batten 2 may be transported in a folded condition and then opened to its full length and attached to a roof structure. The perspective views in FIGS. 6A and B demonstrate an embodiment of this hinged configuration. As shown in FIG. 6A, structural batten 42 includes open composite portions 46 and 46', as well as solid body portions 48 and 48'. It is appreciated that each length 50 and 50' may be about 48 inches to create an overall 96 inch length. The lengths, however, can be changed as needed. As can be appreciated from this view, pivoting structural batten 42 in directions 52 or 54 join portions 50 and 50' together forming the overall length of structural batten 42. Conversely, pivoting portions 50 and 50' in directions 56 and 58 allows portions 50 and 50' to fold onto each other, thereby shortening the batten's overall length.

An illustrative embodiment of the hinging mechanism of structural batten 42 is shown in FIG. 6B. In this illustrative embodiment, opening composite layers 46 and 46' are made up of convoluted layers 60 and one convoluted layer 62. Layers 60 are cut and extend the length of solid body portions 48 and 48' as shown. In contrast, the lower most convoluted layer 62 is not cut and in this embodiment extends the entire length of structural batten 42. When the materials to make layer 62 (like layers 12 and 60) are made out of inherently flexible or sufficiently bendable materials, they may serve as a hinge. In this embodiment, layer 62 is bendable over itself. The ability for these open composite portions to fold will depend on the materials from which they are made. Alternatively, an actual hinge or other flexible member may be attached at the folding point to create the opening and closing effect.

Figure 7:
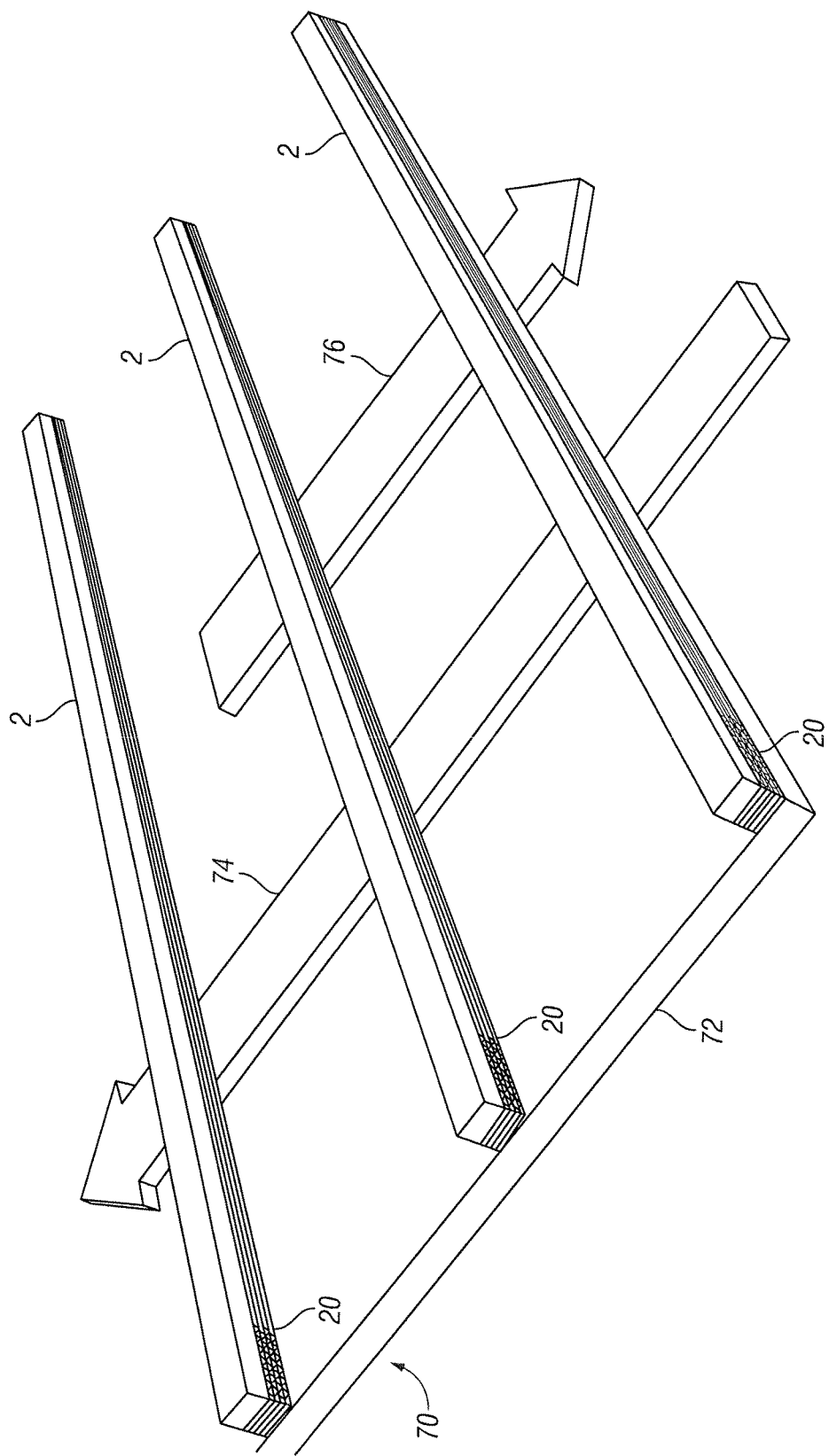
FIG. 7 is a perspective view of structural battens attached to a roof structure.
Figure 8:
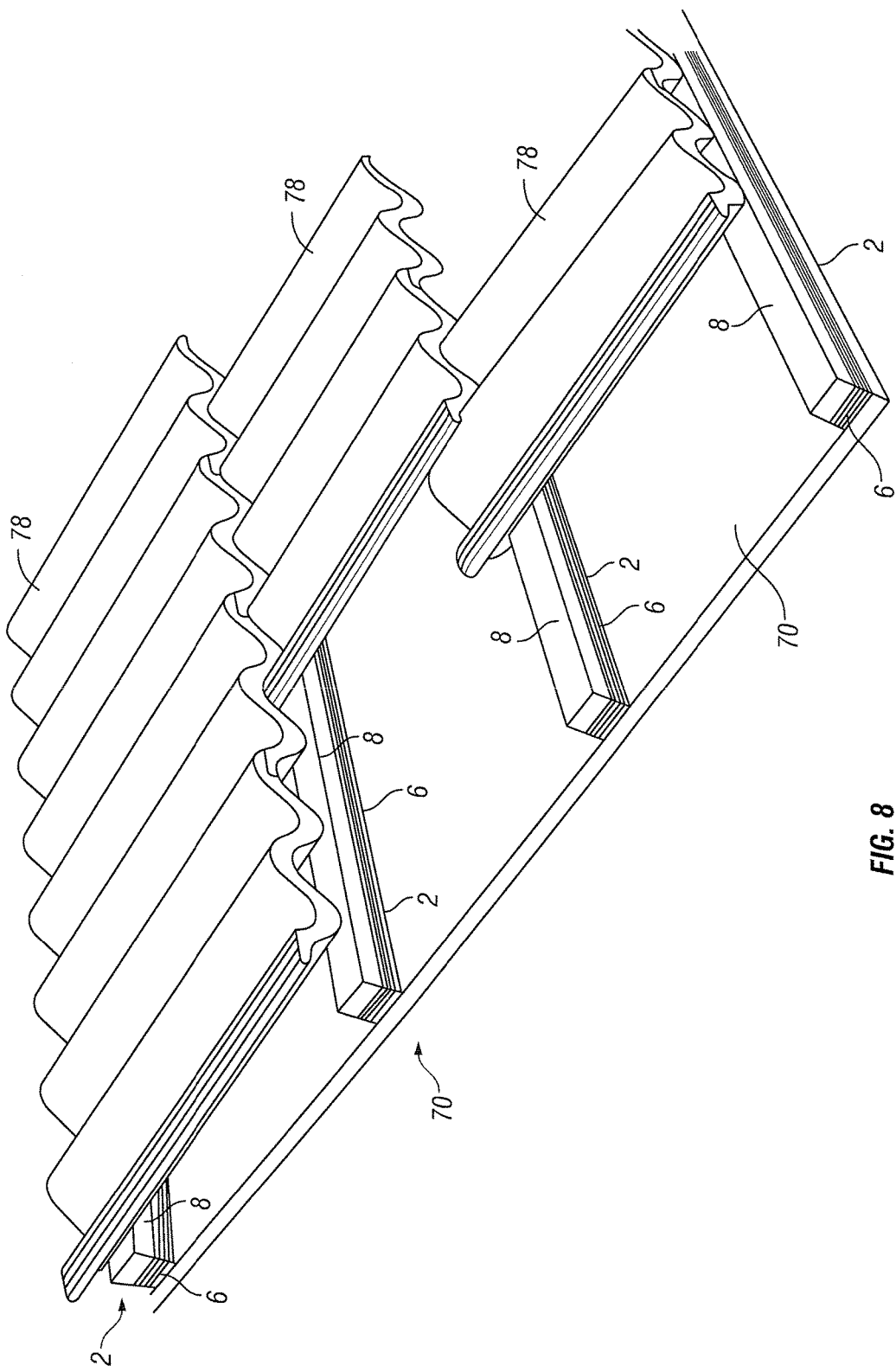
FIG. 8 is a perspective view of the roof structure with structural battens attached thereto along with roof tile attached to the structural battens.
Figure 9:
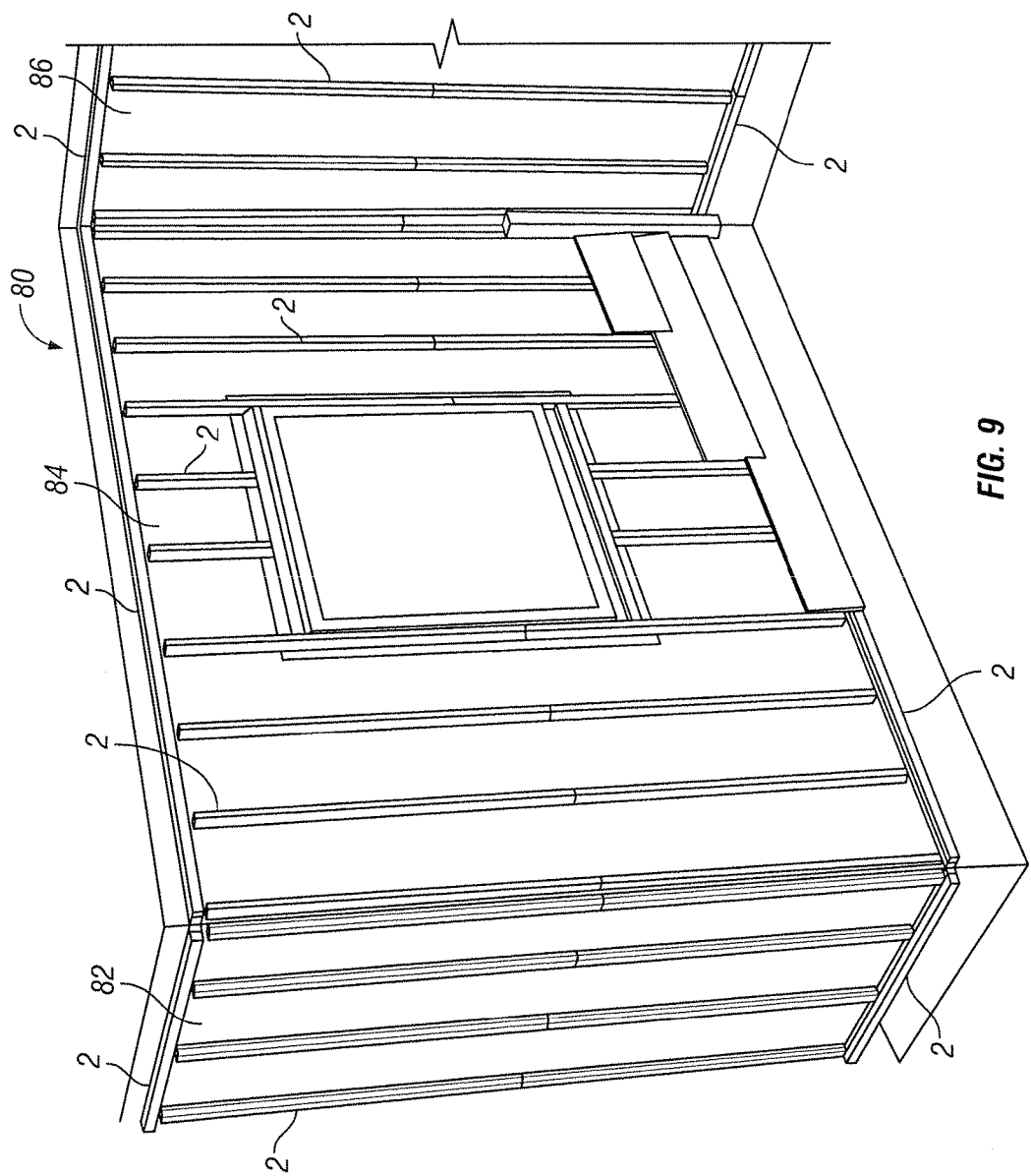
FIG. 9 is a perspective view of a building wall structure with the battens attached thereto in the form of furring strips.

Perspective views in FIGS. 7 through 9 demonstrate illustrative applications for structural battens 2, 22, and 42. For brevity, the battens described in these figures will be identified as batten 2, although all of the descriptions of the battens herein may be used instead. The perspective view of roof structure 70 includes sheeting 72 to provide the sloped roof surface. Structural battens 2 are shown attached to sheeting 72 in a spaced-apart configuration with the plurality of passages 20 oriented in the direction of the slope of roof structure 70, as indicated by directional arrows 74 and 76. It is evident from this view how water using gravity can flow downward in direction 76 off of sheeting 72. Conversely, air to mitigate moisture for example, may flow upward from the exterior of roof structure 70 and across the sheeting through structural battens 2. In short, structural battens 2 allow air to pass through them while allowing water to drain out.

The perspective view of FIG. 8 shows roof structure 70 similar to that shown in FIG. 7, but with roof tiles 78 attached to structural battens 2. Having the solid body portion 8 positioned over open composite portion 6 provides a solid surface for roof tile 78 (or shingles for that matter) to attach to for providing a more secure attachment between roof tile 78 and roof structure 70.

In an alternative use, structural battens 2 may be used in a furring strip-type manner by attaching the same to walls of a building. As shown herein, building structure 80 includes a plurality of walls 82, 84, and 86, each having structural battens 2 attached thereto. In this configuration, the vertically-oriented structural battens 2 have their passages located transverse to the gravitational pull of the water, but they do allow water to drain out. That said, structural battens 2 may also be positioned horizontally at the top and bottom of the walls which will allow both moisture and air to pass through.

Although the present disclosure has been described with reference to particular means, materials, and embodiments, from the foregoing description one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A structural batten comprising:
    a longitudinally extending first layer having a plurality of passages extending between opposing sides of the first layer and transverse to the longitudinal extent of the first layer, wherein the first layer is made of plastic;
    wherein the passages have openings on each of the opposing sides of the first layer and are configured to allow fluid communication from one side of the first layer to the other side and transverse to the first layer's longitudinal extent; and
    a longitudinally extending solid body layer coextensively attached to the first layer along the first layer's longitudinal extent.

2. The structural batten of claim 1, wherein the solid body layer is configured to receive fasteners from construction materials.

3. The structural batten of claim 1, wherein the solid body layer is made from a different material than the first layer.

4. The structural batten of claim 1, wherein the solid body layer is made of wood.

5. The structural batten of claim 1, wherein the plurality of passages in the first layer are formed in a manner selected from the group consisting of a convoluted material, corrugated material, bore through the first layer, molded in the first layer, extruded in the first layer, and assembled in the first layer.

6. The structural batten of claim 1, wherein the solid body layer is attached to the first layer along the first layer's longitudinal extent in a manner selected from the group consisting of an adhesive, fasteners, welding, bonded, molded, welded rivets, nails, screws, heat welds, clips, bands, sewing, chemical bonds, stitched, or straps.

7. The structural batten of claim 1, wherein the first layer includes a plurality of stacked layers of a plurality of passages extending between opposing sides of the stacked layers and transverse to the longitudinal extent of the stacked layers.

8. The structural batten of claim 1, wherein the first layer includes first and second spaced apart sub-layers with a convoluted sub-layer located therebetween and attached to the first and second spaced apart sub-layers; wherein the convoluted sub-layer forms the plurality of passages extending between opposing sides of the first layer and transverse to the longitudinal extent of the first layer.

9. The structural batten of claim 8, wherein the first layer includes a plurality of stacked layers of the first and second spaced apart sub-layers with the convoluted sub-layer located therebetween and attached to the first and second spaced apart sub-layers; and wherein the convoluted sub-layer forms the plurality of passages extending between opposing sides of each of the stacked layers and transverse to the longitudinal extent of each of the stacked layers.

10. The structural batten of claim 1, wherein the solid body layer is made of a material selected from the group consisting of wood, plastic, and metal.

11. The structural batten of claim 1, wherein the solid body layer is made of a laminated material.

12. The structural batten of claim 1, wherein the first layer is made from a sheet of material scored on each side and folded to form the plurality of passages extending between opposing sides of the first layer and transverse to the longitudinal extent of the first layer.

13. The structural batten of claim 12, wherein the sheet of material includes first and second spaced apart sub-layers with a convoluted sub-layer located therebetween.

14. The structural batten of claim 1, wherein the solid body layer has a solid thickness in all dimensions.

15. The structural batten of claim 1, wherein the solid body layer is separable along a plane transverse to the longitudinal extent of the solid body layer; wherein the first layer is partially separable along a plane transverse to the longitudinal extent of the first layer such that a portion of the first layer is bendable to selectively fold or unfold the structural batten.

16. The structural batten of claim 1, wherein the structural batten is attachable to a second structural batten wherein a hinge is attached to both the structural batten and the second structural batten so they selectively fold with respect to one another.

17. A structural batten comprising:
- a longitudinally extending wood strip member;
- a longitudinally extending plastic strip member that includes a plurality of passages extending between opposing sides of the plastic strip member and transverse to the longitudinal extent of the plastic strip member;
- wherein the passages have openings on each of the opposing sides of the plastic strip member and are configured to allow fluid communication from one side of the plastic strip member to the other side and transverse to its longitudinal extent; and
- wherein the wood strip member is stacked on top of and coextensively attached to the plastic strip member.

18. The structural batten of claim 17, wherein the plastic strip member includes a plurality of stacked plastic strip members.

19. A structural batten comprising:
- a longitudinally extending first layer having a plurality of passages extending between opposing sides of the first layer and transverse to the longitudinal extent of the first layer;
- wherein the passages have openings on each of the opposing sides of the first layer and are configured to allow fluid communication from one side of the first layer to the other side and transverse to the first layer's longitudinal extent;
- a longitudinally extending solid body layer attached to the first layer along the first layer's longitudinal extent; and
- wherein the solid body layer is separable along a plane transverse to the longitudinal extent of the solid body layer; and
- wherein the first layer is partially separable along a plane transverse to the longitudinal extent of the first layer such that a portion of the first layer is bendable to selectively fold or unfold the structural batten.

* * * * *